Figure 1:
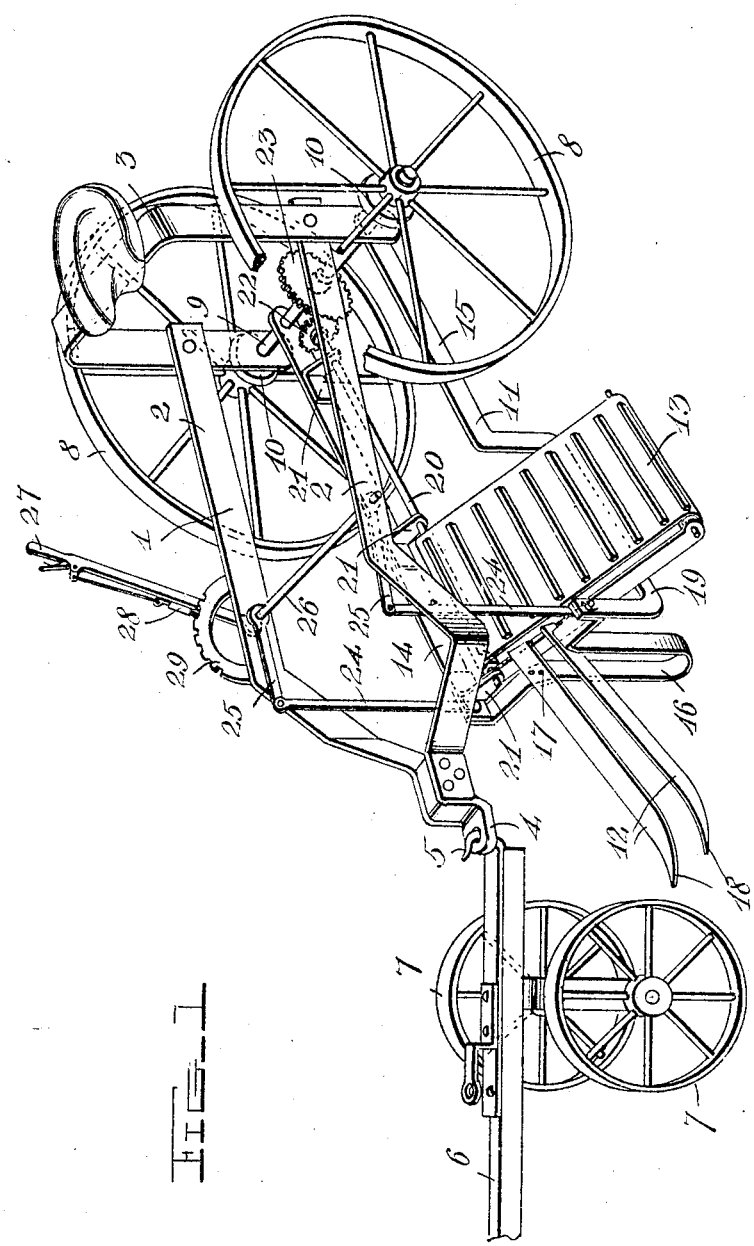

No. 856,817. PATENTED JUNE 11, 1907.
E. A. SMITH.
BEET PULLING MACHINE.
APPLICATION FILED MAY 28, 1906.

2 SHEETS—SHEET 1.

Witnesses

Inventor
Edward A. Smith
by H. B. Willson & Co.
Attorneys

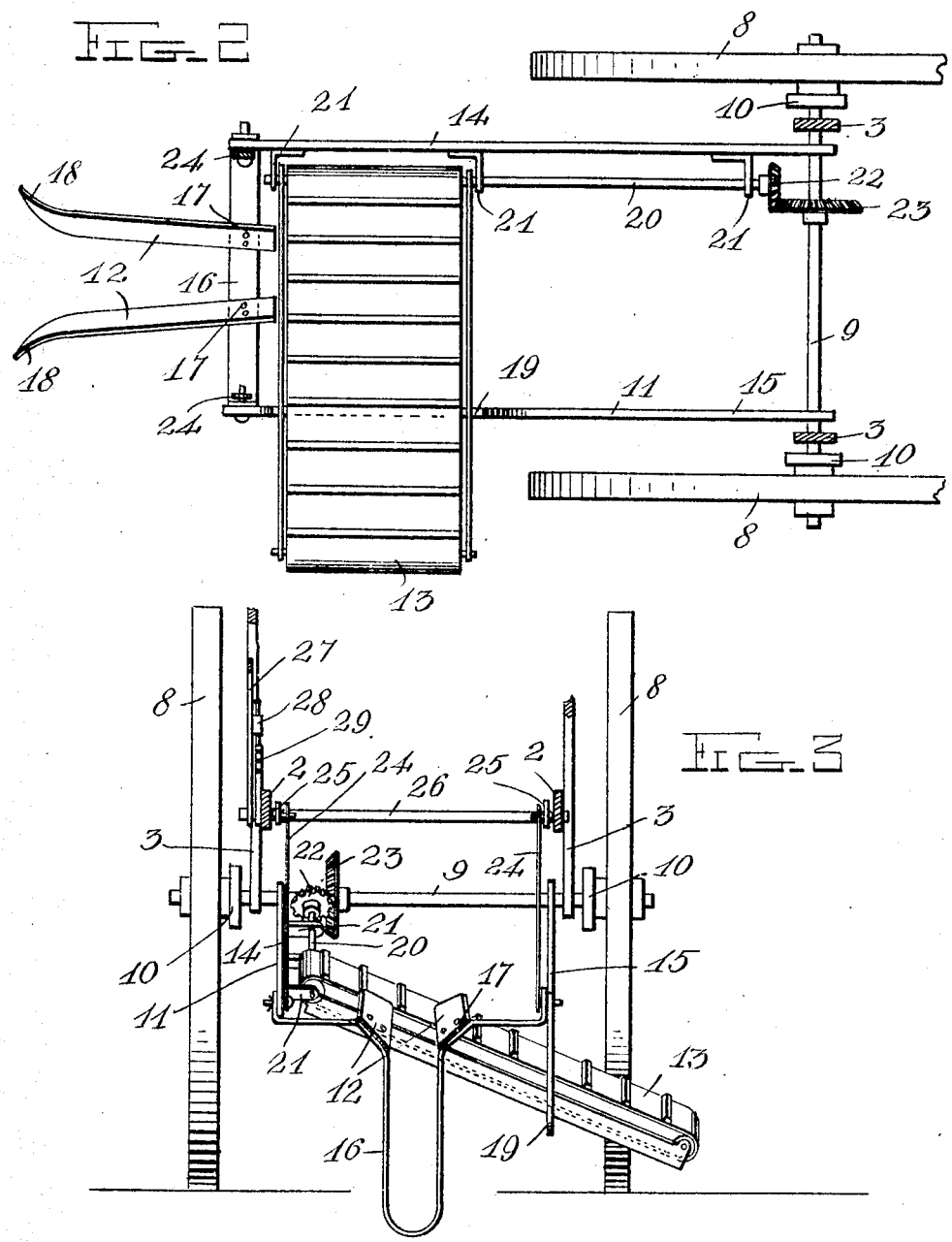

UNITED STATES PATENT OFFICE.

EDWARD A. SMITH, OF LOVELAND, COLORADO, ASSIGNOR TO THE FORT COLLINS IMPLEMENT MANUFACTURING COMPANY, A CORPORATION OF COLORADO.

BEET-PULLING MACHINE.

No. 856,817.      Specification of Letters Patent.      Patented June 11, 1907.

Application filed May 28, 1906. Serial No. 319,182.

*To all whom it may concern:*

Be it known that I, EDWARD A. SMITH, a citizen of the United States, residing at Loveland, in the county of Larimer and State of Colorado, have invented certain new and useful Improvements in Beet-Pulling Machines; and I do declare the following to be a full, clear, and exact description of the invention, such as will enable others skilled in the art to which it appertains to make and use the same.

My invention relates to improvements in machines for pulling beets and the like out of the ground, and consists in the novel construction, combination and arrangement of parts hereinafter fully described and claimed.

The object of the invention is to provide a simple, durable, comparatively inexpensive and highly efficient machine of this character, which when drawn through the field by draft animals, will first elevate or pull the beets out of the ground and then discharge them to one side out of the path of the wheels of the machine.

The above and other objects, which will appear as the nature of my invention is better understood, are accomplished by means of the construction illustrated in the accompanying drawings, in which,—

Figure 1 is a perspective view of my improved beet puller; Fig. 2 is a horizontal sectional view of the same; and Fig. 3 is a detail vertical transverse sectional view.

Referring to the drawings by numeral, 1 denotes the main frame of the machine, which comprises two side beams or bars 2 having their parallel, rear ends connected by a seat carrying arch 3 and their downwardly-bent, converging front ends connected to an apertured coupling plate 4. The aperture in the latter is engaged by the hook 5 on a metal plate secured upon the top of the rear end of a draft tongue 6, which is supported by front steering wheels 7, and which supports the front end of said frame. The rear end of the frame is supported by rear drive wheels 8 mounted upon the ends of a transverse shaft 9 journaled in the rear portion of the frame, said wheels having the usual pawl and ratchet connections inclosed in casings 10 with the shaft to permit the machine to be readily turned.

Adjustably suspended from the main frame 1 is a vertically swinging frame 11, which carries beet pulling bars or arms 12 and a transversely traveling endless carrier or conveyer 13. The frame 11 consists of two side bars 14, 15, which have their rear ends pivotally mounted to swing from the shaft 9 and their front ends connected by a downwardly extending inverted arch or U-shaped cutter 16. The latter is adapted to travel through the ground under the beets and has the downwardly and forwardly inclined pulling bars or arms 12 secured in angular relation to its upper central portion, as shown at 17. The bars or arms 12 are spaced apart sufficiently to receive the beets between their flat, downwardly and inwardly converging upper faces, their forward lower ends being rounded or flared outwardly, as shown at 18. The side bar 15 of the vertically adjustable frame 11 is formed with an offset portion 19, through which extends the lower and outer end of the carrier 13. The latter is so disposed that it receives the beets from the upper rear ends of the bars or arms 12, carries them transversely and discharges them upon the top of the ground to one side of the machine and out of the path of the adjacent wheel 8. While said carrier 13 may be of any suitable form and construction, it is here shown as an endless slatted belt passed over wheels upon shafts journaled in parallel side bars. The lower end of the carrier is supported by the offset portion 19 of the bar 15 and its upper end swings from its upper shaft 20, which is journaled in bearing brackets or hangers 21 secured upon the bar 14. The shaft 20 extends rearwardly and carries a beveled pinion 22, which meshes with a beveled gear 23 secured upon the shaft 9, so that the latter operates the carrier when the machine is drawn forwardly.

In order to vary the depth to which the beet pulling bars or arms 12 enter the ground, I connect the front ends of the side bars 14, 15, of the frame 11 by means of links 24 to crank-arms 25 upon a transverse shaft 26 journaled in the side bars 2 of the frame 1. The shaft 26 has upon one of its ends a lever 27, which carries the usual spring-seated, hand-retracted pawl 28 to engage a segmental rack 29 provided upon the frame 1. By rocking and adjusting the lever 27, the pulling arms 12 and the inverted arch 16 may be raised and lowered as is found necessary to pull the beets in the most efficient manner.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new, and desire to secure by Letters-Patent, is,—

1. A machine of the character described comprising a main frame, a vertically swinging frame pivoted at its rear upon said main frame, means for adjustably supporting the front of said swinging frame, downwardly and forwardly inclined pulling arms upon the front of said swinging frame, and a transverse carrier upon said swinging frame in rear of said arms, substantially as described and for the purpose set forth.

2. A machine of the character described comprising a main frame, wheels for supporting the latter, a drive shaft for the rear wheels, a vertically adjustable frame swung from said shaft, an inverted arch upon said adjustable frame, forwardly and downwardly inclined pulling arms upon said arch, an endless carrier upon said adjustable frame, and driving gearings between said carrier and said shaft, substantially as described.

3. A machine of the character described comprising a main frame, wheels for supporting the latter, a drive shaft for the rear wheels, a vertically adjustable frame swung from said shaft, an inverted arch upon said adjustable frame, forwardly and downwardly inclined pulling arms upon said arch, an endless carrier upon said adjustable frame, a shaft for operating said endless carrier, beveled gears connecting said shafts, a crank shaft, a lever for rocking the latter and holding it in an adjusted position, and a connection between the crank of said shaft and said adjustable frame, substantially as described.

4. A machine of the class described having a transversely-disposed, downwardly-extending, U-shaped cutter to run under the beets, forwardly and downwardly-inclined pulling bars, spaced apart, extending forwardly from and having their rear ends secured to and supported by the upper portions of said cutter, a frame to which the upper portion of said cutter is attached, and a transversely-disposed, inclined conveyer in rear of said cutter and also carried by the said frame.

In testimony whereof I have hereinto set my hand in presence of two subscribing witnesses.

EDWARD A. SMITH.

Witnesses:
   JOHN A. CROSS,
   MAUD E. MORGAN.